July 29, 1958     F. L. JURY     2,845,505
BRAKE SWITCH
Filed June 20, 1956
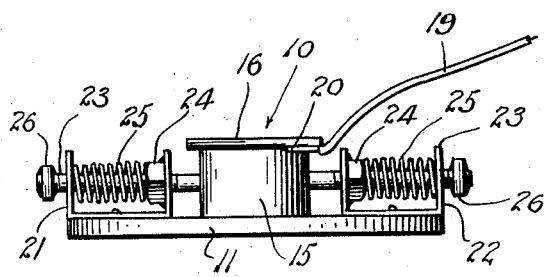
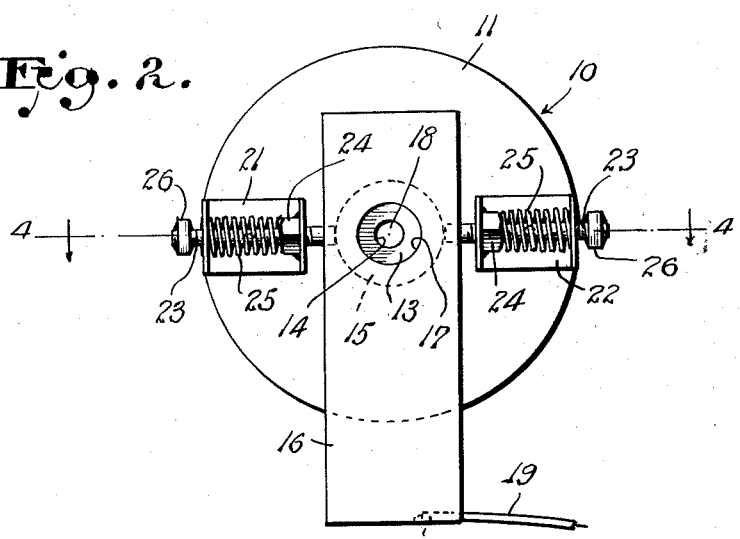
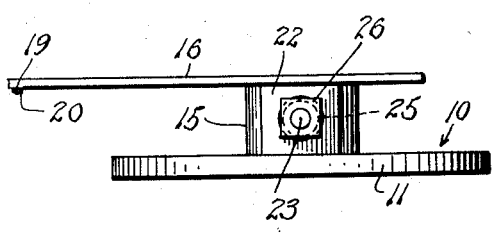
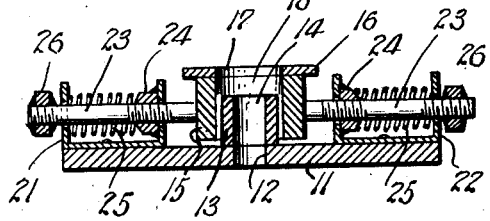
INVENTOR.
Frederick L. Jury
BY
*Patrick D. Beavers*
ATTORNEY.

United States Patent Office 2,845,505
Patented July 29, 1958

2,845,505

BRAKE SWITCH

Frederick L. Jury, Colorado Springs, Colo.

Application June 20, 1956, Serial No. 592,649

1 Claim. (Cl. 200—80)

This invention relates to a switch control for a brake actuating motor that will apply the brakes when the brake actuating motor stops.

An object of the invention is to provide a switch control that is operated by a storage battery so that the brakes on a trailer will be set when the trailer becomes unhitched from the automobile that is towing the trailer.

With the above and other objects and advantages in view the invention consists of the novel details of construction, arrangement and combination of parts more fully hereinafter described, claimed and illustrated in the accompanying drawing in which:

Fig. 1 is a side elevational view of a switch embodying the invention;

Fig. 2 is a top plan view of Fig. 1;

Fig. 3 is a side elevational view with the switch turned 90 degrees from the position in Fig. 1; and Fig. 4 is a transverse sectional view on the line 4—4 of Fig. 2.

Referring more in detail to the drawing, wherein like parts are designated by like reference numerals, the reference numeral 10 is used to generally designate a switch embodying the invention.

The switch 10 comprises a steel disc or base plate 11 having a central opening 12 therein to receive the drive shaft of an electric motor, not shown, for the rotation of the steel disc or base plate 11, as will be later described.

A copper bushing 13 is secured to the disc 11 with the opening 14 therein in alinement with the opening 12 in the disc 11. A copper tubular member 15 is positioned on the bushing 13 circumjacent thereto. The inner surface of the tubular member 15 is spaced from the copper bushing 13 and the disc 11 so that the necessity for insulation between these members is eliminated.

An elongated rectangular shaped copper plate 16 is secured to the top of the member 15 and an opening 17 in the plate 16 is in alinement with the bore 18 of the member 15. A wire 19 is soldered at 20 to the plate 16 at one end and at the other end is connected to the positive pole of a battery, not shown. The copper plate 16 is fixed to a suitable support, not shown, so that the copper plate 16 is stationary while the disc 11 rotates.

A pair of U-shaped mounting members 21 and 22, respectively, are secured to the disc 11 in diametrically opposed relation to each other and a brass rod 23 is mounted in each of the members 21 and 22, respectively.

Each of the rods 23 extend outwardly of the mounting members 21 and 22 until the inner end of each of the rods 23 engages the member 15, a nut 24 is then soldered to each of the rods 23 within the members 21 and 22 and acts as a stop for the member with which it is associated.

A coil spring 25 is placed on each of the rods 23 circumjacent therewith and engaging the nut 24 urges the rods 23 into contact with the member 15.

A second nut 26 is welded to the outer end of each of the rods 23 outwardly of the mounting members 21 and 22, respectively.

The disc 11 is connected to the negative pole of the battery to complete the circuit to the switch 10.

When the motor is rotating the disc 11 the rods 23 are forced away by centrifugal force from the member 15 to break the circuit. However, when the motor stops, and the disc 11 is no longer rotating the rods 23 engage the member 15 to complete the circuit and set the brakes on the trailer.

The brakes will remain set until the motor again starts rotating the disc 11 at which time centrifugal force will again cause the rods 23 to lose contact with the member 15 and the brakes will be released.

It is believed that from the foregoing description the operation and construction of the switch will be apparent to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

A switch control comprising a disc having a central opening therein, a bushing mounted on said disc circumjacent with the central opening therein to receive the drive shaft of an electric motor so that said disc is rotated in a horizontal plane, means including a wire for connecting said disc to the negative pole of a battery, a fixed plate having an opening in one end thereof, a tubular member secured to said plate in circumjacent relation to the opening therein, said plate being mounted so that said tubular member is positioned in circumjacent spaced relation to said bushing and said disc, means including a wire for connecting said plate to the positive pole of a battery, circuit breaking means including a pair of U-shaped mounting members secured to said disc in diametrically opposed relation to each other, a rod slidably mounted in each of said mounting members, stop means mounted on each rod within said mounting members, and a coil spring mounted on each rod in contact with said stop means to urge said rods toward said tubular member to complete a circuit.

References Cited in the file of this patent

UNITED STATES PATENTS

| 1,558,487 | Krauss | Oct. 27, 1925 |
| 1,996,848 | Arden | Apr. 9, 1935 |
| 2,516,050 | Evans et al. | July 18, 1950 |
| 2,676,225 | Jubell | Apr. 20, 1954 |